United States Patent [19]

Kokeguchi

[11] Patent Number: 5,217,249
[45] Date of Patent: Jun. 8, 1993

[54] PRESSURE RELIEF FOR A PASSENGER SIDE AIR BAG

[75] Inventor: Akira Kokeguchi, Shiga, Japan

[73] Assignee: Takata Corporation, Tokyo, Japan

[21] Appl. No.: 786,935

[22] Filed: Nov. 4, 1991

[30] Foreign Application Priority Data

Nov. 30, 1990 [JP] Japan .................. 2-334587

[51] Int. Cl.⁵ .................................. B60R 21/16
[52] U.S. Cl. ........................... 280/728; 137/467; 137/860; 137/68.1; 137/67; 222/397
[58] Field of Search ........... 280/728, 732, 736, 739, 280/740, 741, 742; 102/530, 531; 422/165, 164, 166, 113; 222/3, 397; 137/467, 860, 68.1, 67

[56] References Cited

U.S. PATENT DOCUMENTS

| | | | |
|---|---|---|---|
| 2,757,685 | 8/1956 | Fritsch | 137/860 |
| 3,190,496 | 6/1965 | Weiland, Jr. et al. | 222/3 |
| 4,066,415 | 1/1978 | Kasama et al. | 280/741 |
| 4,352,365 | 10/1982 | Boccardo et al. | 137/68.1 |
| 4,394,033 | 7/1983 | Goetz et al. | 280/740 |
| 4,817,828 | 4/1989 | Goetz | 280/736 |
| 4,964,652 | 10/1990 | Karlow | 280/731 |
| 5,054,811 | 10/1991 | Unterforsthuber et al. | 280/742 |

FOREIGN PATENT DOCUMENTS

| | | | |
|---|---|---|---|
| 0109790 | 5/1984 | European Pat. Off. | |
| 896312 | 10/1953 | Fed. Rep. of Germany | 280/732 |
| 3733486 | 4/1988 | Fed. Rep. of Germany | |
| 2164248 | 7/1973 | France | |
| 229739 | 9/1989 | Japan | 280/736 |
| 32957 | 2/1991 | Japan | 280/740 |
| 1375815 | 11/1974 | United Kingdom | |
| 2022194 | 12/1979 | United Kingdom | 280/740 |

Primary Examiner—Karin L. Tyson
Attorney, Agent, or Firm—Kanesaka and Takeuchi

[57] ABSTRACT

An air bag system for an assistant driver's seat comprises a housing including an open face to allow air bag deployment, an air bag folded in the housing, a gas generator secured to the rear wall of the housing opposite to the open face, first outlets formed in the gas generator to allow gases to flow into the air bag stored in the housing, second outlets formed in the gas generator to allow the gases to flow out of the housing, a passage defined in the housing to provide a communication between the second outlets and the outside of the housing, and a release mechanism situated in the passage for allowing the gases to flow from the gas generator into the outside of the housing through the passage when the pressure of the gases flowing through the second outlets exceeds a predetermined level.

3 Claims, 6 Drawing Sheets

PRESSURE RELIEF FOR A PASSENGER SIDE AIR BAG

FIELD OF THE INVENTION

The present invention relates to air bag systems for an assistant driver's seat or passenger seat and in particular, to an air bag system constructed to allow gases to flow from a gas generator (hereinafter, sometimes simply referred to as a generator) to the atmosphere outside an air bag housing when the pressure of the gases exceeds a predetermined level.

RELATED ART

An air bag system for an assistant driver's seat is designed to protect a vehicle occupant seated on a front seat next to the driver in the event of an impact or collision of a vehicle. As is well known, a gas generator is actuated to rapidly generate gases to inflate an air bag when a vehicle collides or is substantially accelerated.

Figure 8:
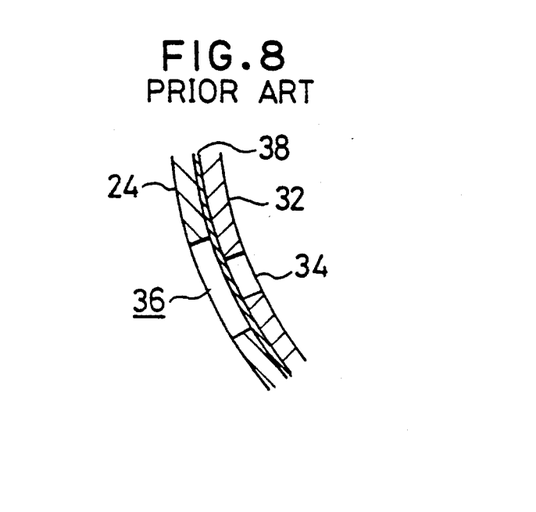
FIG. 8 is an enlarged sectional view of a portion indicated by VIII in FIG. 7.
Figure 9:
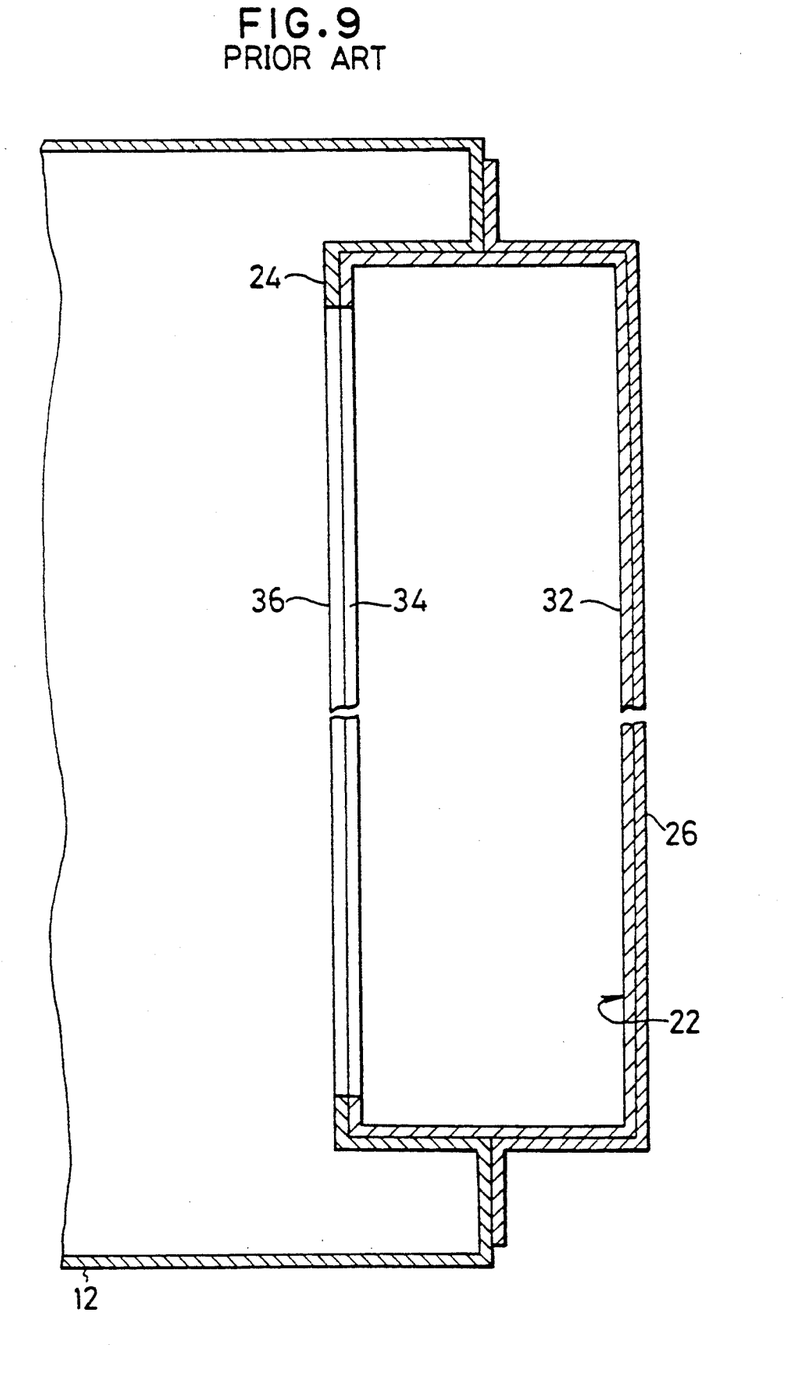
FIG. 9 is a sectional view taken along the line IX—IX in FIG. 7.

Such a conventional air bag system will be described with reference to FIGS. 7 to 9.

Figure 7:
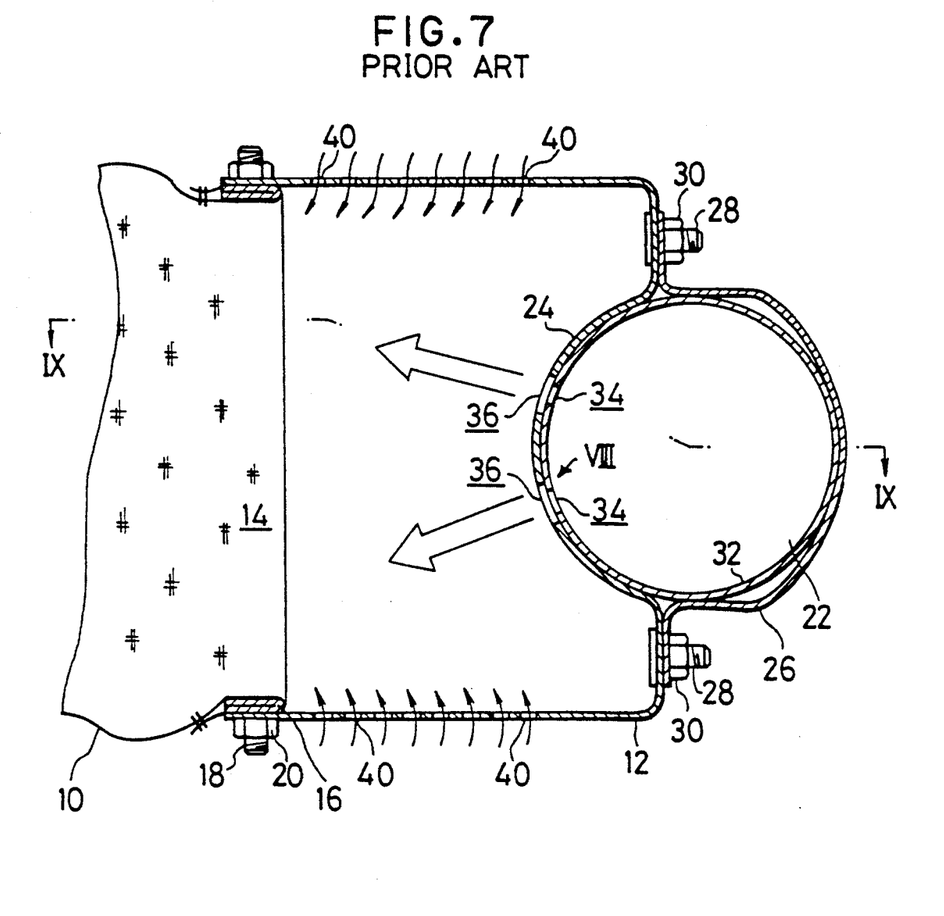
FIG. 7 is a sectional view of a conventional air bag system for an assistant driver's seat.

FIG. 7 is a vertical sectional view of a conventional air bag system for an assistant driver's seat. FIG. 8 is an enlarged view showing a portion indicated by VIII in FIG. 7. FIG. 9 is a sectional view taken along the line IX—IX of FIG. 7. FIG. 7 shows an air bag 10 in an inflated condition.

The air bag 10 is contained in a folded condition within a container or housing 12 before it is inflated. The container 12 has an open face 14 through which the air bag 10 is deployed from the container 12 into the interior of a vehicle. The proximal end of the air bag 10 is secured with a reinforcing plate 16 to the peripheral edge of the open face of the container 12 by a bolt 18 and a nut 20. A gas generator 22 is attached to the rear wall of the container 12. In the illustrated embodiment, the rear wall of the container 12 is arcuately recessed to provide a generator holding portion 24. The cylindrical gas generator 22 is received in the generator holding portion 24. A substantially semicylindrical retainer 26 is secured to the rear wall of the container 12 by bolts 28 and nuts 30 from the back of the container 12 to fix the gas generator 22 in position between the retainer 26 and the gas generator holding portion 24.

The gas generator 22 includes a cylindrical casing 32 in which chemical materials are filled to rapidly produce gases. The casing 32 has a plurality of outlets (first outlets) 34 through which gases enter into the container 12. The generator holding portion 24 includes a plurality of apertures 36 aligned with the first outlets 34. As shown in FIG. 8, a metallic seal tape 38 is affixed to the outer surface of the casing 32 to close the first outlets 34. The seal tape 38 is torn to provide a communication between the first outlets 34 and the apertures 36 when the gas generator 22 is actuated to produce gases.

A number of air inlets 40 is formed in the top wall and the bottom wall of the container 12. When the gases enter into the container 12 through the first outlets 34 and apertures 36, external air also flows through the air inlets 40 into the container 12 to rapidly deploy the air bag 10.

While such a conventional air bag system is transferred from an air bag factory to an automobile assembly line or is placed in storage, the chemical materials may react to produce gases if fire occurs. These gases flow through the first outlets 34 and the apertures 36 so as to inflate the air bag 10. As the gases have a substantially high pressure, a transfer or storage package may be broken by the air bag 10. To this end, the package must have high strength to inhibit inflation of the air bag. This results in an increase in the cost for transferring or storing the air bag system.

Figure 10:
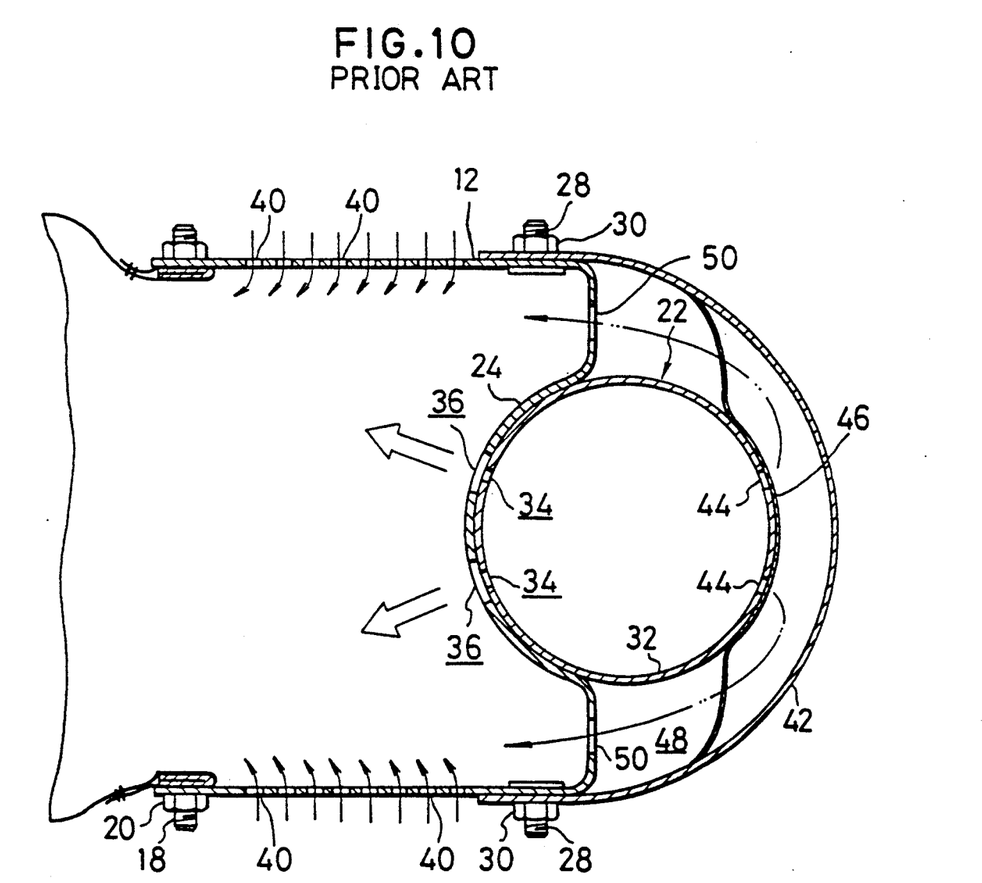
FIG. 10 is a vertical sectional view of another conventional air bag system for an assistant driver's seat.

FIG. 10 shows another conventional air bag system designed to reduce the cost for transporting or storing air bags. Referring to FIG. 10, a container 12 has a generator holding portion 24 in which a gas generator 22 is held. A cover 42 is secured to the rear wall of the container 12 and spaced a predetermined distance from the gas generator 22. The gas generator 22 includes a casing 32. The casing 32 has a plurality of first outlets 34, and a plurality of second outlets 44 formed in a diametrically opposite relation to the first outlets 34 and adapted to allow gases to flow out of the gas generate 22 in a direction opposite to the direction in which gases flow through the first outlets 34. A metallic seal tape 46 is affixed to the outer surface of the casing 32 to close the second outlets 44. The reference numeral 48 designates a space defined between the gas generator 22 and the cover 42. 50 designates inlet ports formed in the rear wall of the container 12 to provide a communication between the interior of the container 12 and the space 48.

In the air bag system shown in FIG. 10, gases flow from the gas generator 22 into the air bag 10 only through the first outlets 34 when the pressure of the gases is below a predetermined level. When the pressure of the gases is above the predetermined level, the metallic seal tape 46 is torn to open the second outlets 44. This causes the gases to flow into the container 12 not only through the first outlets 34, but also through the second outlets 44, the space 48, and the inlet ports 50. When a part of the gases is thus discharged through the second outlets 44 and flows behind the gas generator 22 into the container 12, then the air bag 12 inflates with less inflation pressure than when the gases flow through both of outlets 34, 44. The low inflation pressure permits a transfer or storage package to have less resistance to pressure.

In the air bag arrangement shown in FIG. 10, however, gases partly flow out of the gas generator 22 through the second outlets 44 in the event of a collision. This results in a decrease in the volume of gases flowing forwards through the first outlets thus, the speed of deployment of the air bag 10.

As previously noted, the prior art air bag system must firmly be packaged while they are transferred from an air bag factory to an automobile assembly line or placed in storage. This results in an increase in the cost involved with the transfer or storage of the air bag system. In order to reduce such cost, attempts have been made to cause a part of gases to flow around the gas generator from its back and enter into the container. In such a case, however, the air bag is deployed at a slow rate of speed.

OBJECT AND SUMMARY OF THE INVENTION

It is an object of the present invention to provide an air bag system for an assistant driver's seat or a passenger seat which can be packed in a package having low resistance to pressure, thus resulting in a decrease in the packaging cost.

It is another object of the present invention to provide an air bag system for an assistant driver's seat which is highly safe since it is never or hardly inflated if fire occurs when the air bag system is transferred or placed in storage.

According to the present invention, there is provided an air bag system for an assistant driver's seat comprising a housing including an open face to allow air bag deployment, an air bag folded in the housing, a gas generator secured to the rear wall of the housing opposite to the open face, first outlets formed in the gas generator to allow gases to flow into the air bag stored in the housing, second outlets formed in the gas generator to allow the gases to flow out of the housing, a passage defined in the housing to provide a communication between the second outlets and the outside of the housing, and a relief mechanism situated in the passage for allowing the gases to flow from the gas generator into the outside of the housing through the passage when the pressure of the gases flowing through the second outlets exceeds a predetermined level.

When a vehicle with the air bag system of the present invention is subject to substantial acceleration in the event, for example, of a collision, the gas generator is caused to generate gases to rapidly inflate the air bag. In this case, the pressure in the gas generator does not exceed a predetermined level. The gases enter into the housing only through the first outlets so as to inflate the air bag. As the gases are supplied to the container only through the first outlets, the gases flows fast. Therefore, the air bag is deployed at a substantially high rate of speed.

The air bag system of the present invention is packaged when it is transferred from an air bag factory to an automobile assembly line or placed in storage. The gas generator is caused to generate gases when the air bag apparatus or a package thereof is burned in a fire. In such a case, the gases enter into the housing through the first outlets, but the air bag can not fully be deployed. This results in a substantial increase in the pressure in the gas generator, which is greater than a predetermined pressure. The relief mechanism then allows the gases to flow from the gas generator through the second outlets and the passages into the atmosphere outside the housing. This reduces the pressure of the gases flowing through the first outlets into the air bag to prevent deployment of the air bag.

When the air bag system of the present invention encounters a fire during transfer or storage, deployment of the air bag is restricted. A transfer or storage package can thus have less resistance to pressure. This results in a decrease in the packaging cost.

PREFERRED EMBODIMENTS

The present invention will now be described by way of example with reference to the drawings.

Figure 1:
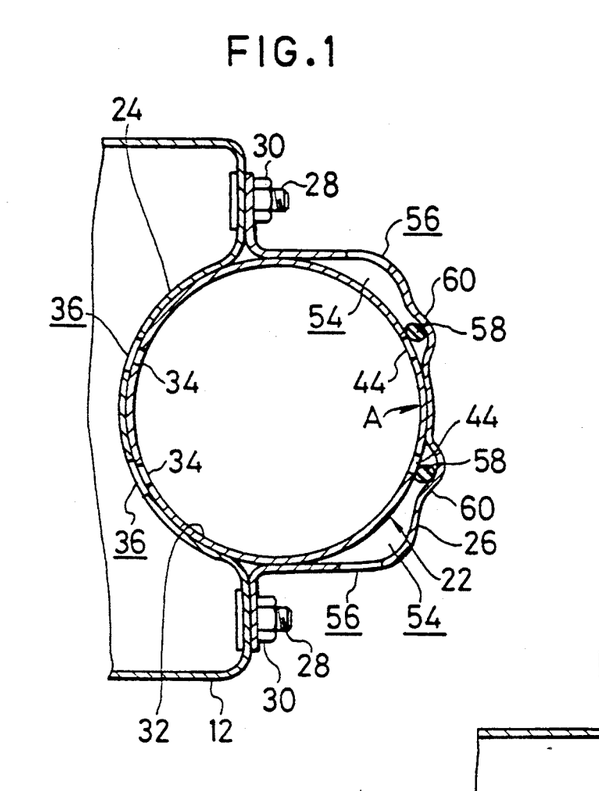
FIG. 1 is a vertical sectional view showing the principal part of an air bag system for an assistant driver's seat made according to one embodiment of the present invention.
Figure 2:
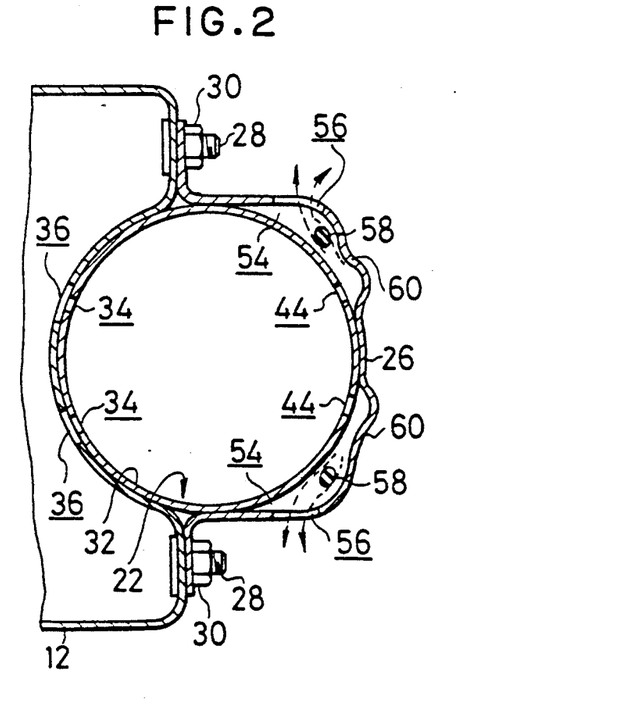
FIG. 2 is a sectional view illustrating the operation of the air bag system shown in FIG. 1.

FIG. 1 is a vertical sectional view of an air bag system for an assistant driver's seat made according to one embodiment of the present invention. FIG. 2 illustrates the air bag system in use. In this embodiment, a container 12 has a generator holding portion 24 to receive a gas generator 22. A retainer 26 is secured to the outer surface of the container 12 by bolts 28 and nuts to fix the gas generator 22 to the container 12. In this embodiment, the container 12 and the retainer 26 constitute a housing to contain an air bag (not shown in FIG. 1).

The gas generator 22 includes a casing 32. The casing 32 has first outlets 34 through which gases enter into the container 12 via apertures 36, and second outlets 44 in opposite relation to the first outlets 34. In this embodiment, a pair of second outlets 44 is located above and below a rear portion A of the generator.

The retainer 26 is in abutment with the portion A of the gas generator 22. Upper and lower gas passages 54 are formed between the retainer 26 and the gas generator 22 and extend above and below the portion A. The retainer 26 has vents 56 through which the gas passages 54 are communicated with the outside of the retainer 26 (atmosphere). O-rings 58 are provided in the gas passages 54 adjacent to the second outlets 44 to inhibit communication between the second outlets and discharge openings 56. Engagement portions 60 project from the retainer 26 toward the gas generator 22 to hold the O-rings 58 in position.

A metallic seal tape (see one indicated by 38 in FIG. 8) is affixed to the outer surface of the gas generator 22 to close the first outlets 34.

The air bag system thus constructed is mounted in a vehicle. In the event of a vehicle collision, the gas generator 22 is actuated to generate gases. These gases flow through the first outlets 34 to tear the seal tape (not shown in FIG. 1) and then, enter into the container 12 through the apertures 36. The air bag folded in the container 12 is then rapidly inflated in the vehicle compartment to protect a vehicle occupant. In this case, the pressure of the gases is below a predetermined level since the air bag can rapidly be inflated in the vehicle compartment. The pressure of the gases, acting on the O-rings 58, is also below the predetermined level. The O-rings 58 are thus kept in engagement with the engagement portions 60. Accordingly, no gas flows into the gas passages 54. Those gases generated by the gas generator 22 flow only through the first outlets 34.

The air bag system shown in FIG. 1 is packaged when it is transferred or placed in storage. If fire occurs during transfer or storage, the gas generator 22 is caused to produce gases. However, the air bag system can not be deployed rapidly since it is packaged. Under the circumstances, the pressure in the gas generator 22 exceeds a predetermined level. Also, more pressure is applied to the 0-rings 58 as the gases flows through the second outlets 44. The O-rings 58 are then moved off the engagement portions 60 as shown in FIG. 2. This brings the gas generator 22 into communication with the gas passages 54. The gases then flow from the gas generator 22 rapidly into the atmosphere through the second outlets 44, the gas passages 54 and the discharge openings 56. This results in a decrease in the pressure in the gas generator 22. Accordingly, the air bag is in no way or hardly inflated. As a result, a package of the air bag system is not broken by the inflating air bag. Therefore, such a package does not need high resistance to pressure to reduce the packaging cost of the air bag apparatus.

Figure 3:
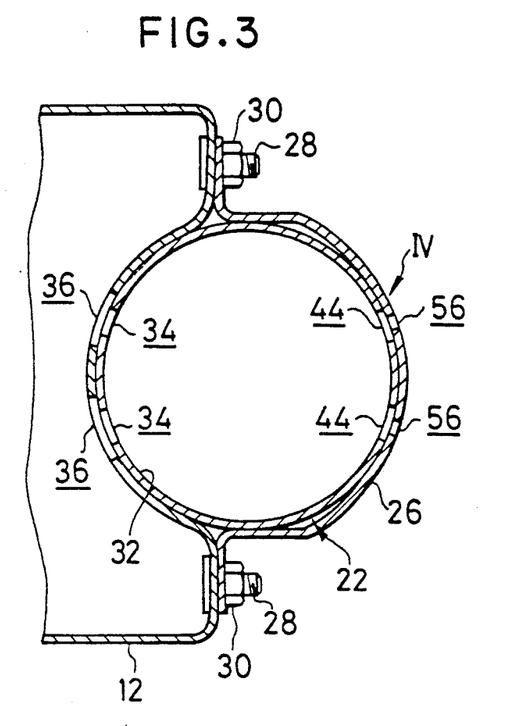
FIG. 3 is a vertical sectional view showing the principal part of an air bag system for an assistant driver's seat made according to another embodiment of the present invention.
Figure 4:
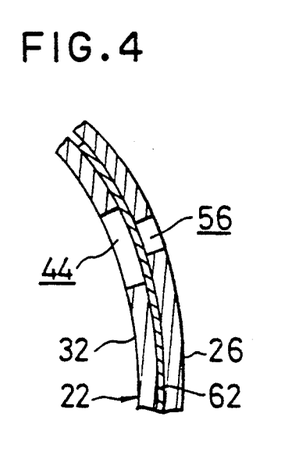
FIG. 4 is an enlarged sectional view of a portion indicated by IV in FIG. 3.

FIG. 3 is a vertical sectional view of an air bag system for an assistant driver's seat according to another embodiment of the present invention. FIG. 4 is an enlarged view of a portion indicated by IV in FIG. 3. In this embodiment, the second outlets 44 correspond in position to the discharge openings 56 of the retainer 26. A metallic seal tape 62 is affixed to the outer surface of the gas generator 22 to cover the second outlets 44. In this embodiment, another metallic seal tape 38 (not shown in FIG. 3, see FIG. 8) is affixed to close the first outlets 34. These two seal tapes 38 and 62 have the same thickness, but different diameters. As such, the seal tape 38 used to cover the first outlets 34 is first ruptured as the pressure in the gas generator 22 gradually increases. Further increase in the pressure of the gas generator 22 causes rupture of the seal tape 62 used to cover the second outlets 44.

The remaining components of the air bag system shown in FIG. 3 are identical to those shown in FIG. 7 and will not be explained herein. Like reference numerals designates like components.

When a vehicle with the air bag system constructed as shown in FIGS. 3 and 4 collides, the gas generator 22 is actuated to generate gases. The gases flow into the container 12 through the first outlets 34 and the apertures 36 so as to rapidly inflate the air bag. On the other hand, if fire occurs while the air bag system of FIGS. 3 and 4 is packaged, the pressure in the gas generator 22 exceeds a predetermined level since the air bag stored in the container 12 can not be deployed rapidly. This causes rupture of the seal tape 62. The gases then flow from the gas generator 22 into the atmosphere through the second outlets 44 and the discharge openings 56. Under the circumstances, the air bag is in no way or hardly inflated. A package of FIGS. 3 and 4 also can have less resistance to pressure. This results in a decrease in the packaging cost.

Figure 5:
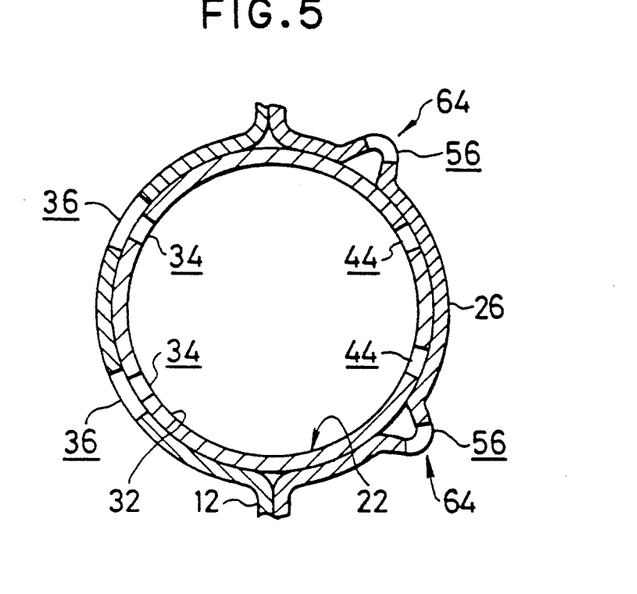
FIG. 5 is a vertical sectional view showing the principal part of an air bag system for an assistant driver's seat made according to a further embodiment of the present invention.
Figure 6:
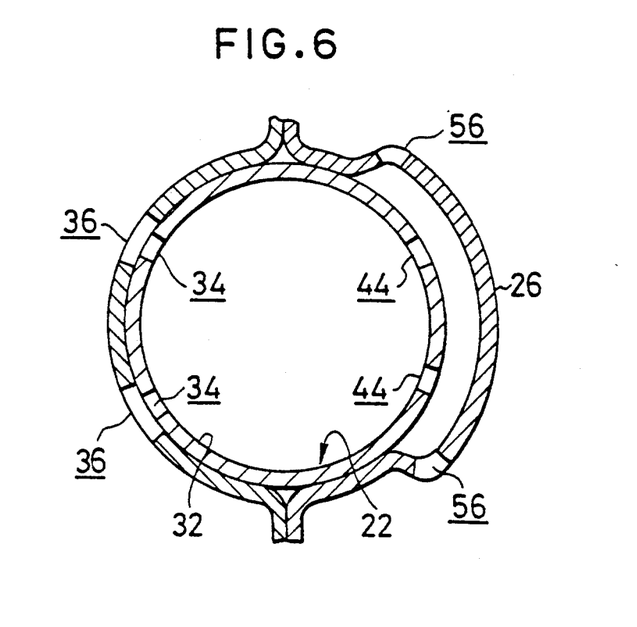
FIG. 6 is a view illustrating the operation of the air bag system shown in FIG. 5.

FIG. 5 is a vertical sectional view of an air bag system for an assistant driver's seat according to a further embodiment of the present invention. FIG. 6 illustrates the air bag system in use. In this embodiment, the retainer 26 is closely contacted with the outer surface of the gas generator 22 so as to cover the second outlets 44. Two projections 64 extend outwardly from the retainer 26, one above the upper second outlet 44 and the other below the lower second outlet 44. The discharge openings 56 are formed in these two projections 64. The remaining components of the air bag system according to this embodiment are identical to those shown in FIG. 7 and will not be explained herein. Like reference numeral designate like components.

When a vehicle with the air bag system of FIG. 5 collides, the gas generator 22 is actuated to generate gases. These gases enter into the container 12 only through the first outlets 34 and the apertures 36 so as to rapidly inflate the air bag folded in the container.

The air bag system of FIG. 5 is packaged during transfer or storage. Under the circumstances, the air bag is not readily deployed in the event of fire. This causes the pressure in the gas generator 22 to exceed a predetermined level. This increased pressure is applied through the second outlets 44 to press the retainer 26. The rear wall of the retainer between the two projections 64 and 64 is pressed outwards or deformed as shown in FIG. 6. As a result, the gas generator 22 is vented to the atmosphere and the pressure in the gas generator 22 is released through the second outlets 44 and the discharge openings 56. This prevents deployment of the air bag. Also, according to this embodiment, a package can have less resistance to pressure. This results in a decrease in the packaging cost.

I claim:

1. An air bag system for a passenger seat, comprising:
    a housing having an open face to allow air bag deployment, and a rear wall at a side opposite to the open face;
    an air bag folded in said housing;
    a gas generator secured to the rear wall of the housing;
    first outlets formed in the gas generator to allow gas to flow into said air bag folded in the housing;
    second outlets formed in said gas generator to allow the gas to flow out of said housing;
    a passage defined in said housing to provide a communication between said second outlets and an outside of the housing; and
    relief means situated in the passage for allowing the gas to flow from said gas generator into the outside of the housing through the passage when a pressure of the gas flowing through said second outlets exceeds a predetermined level, said relief means including an O-ring disposed to close the passage, and an engagement portion situated in the passage for preventing outward movement of the O-ring from the housing, said O-ring being disengaged from the engagement portion under the pressure of the gas to open said pressure when the pressure of the gas from the gas generator exceeds the predetermined level.

2. An air bag system for a passenger seat, comprising:
    a housing having an open face to allow air bag deployment and a rear wall at a side opposite to the open face;
    an air bag folded in said housing;
    a gas generator secured to the rear wall of the housing;
    first outlets formed in the gas generator to allow gas to flow into said air bag folded in the housing;
    second outlets formed in said gas generator to allow the gas to flow out of said housing;
    a passage defined in said housing to provide a communication between said second outlets and an outside of the housing;
    a retainer for mounting the gas generator to the housing; and
    relief means situated in the passage for allowing the gas to flow from said gas generator into the outside of the housing through the passage when a pressure of the gas flowing through said second outlets exceeds a predetermined level, said relief means having a metal plate for constituting the retainer and positioned to close the passage, said metal plate being deformed by the gas to largely open the passage when the pressure of the gas exceeds the predetermined level.

3. The air bag system of claim 1, wherein said retainer has a contact portion held in close contact with said gas generator to close said second outlets, projections positioned adjacent to said contact portion, and openings formed in said projections, said contact portion being moved off said gas generator under the pressure of the gas to provide a communication between said second outlets and said openings so as to open said passage when the pressure of the gas from said gas generator exceeds said predetermined level.

* * * * *